United States Patent [19]

Kawasoe

[11] Patent Number: 5,297,059
[45] Date of Patent: Mar. 22, 1994

[54] TESTING DEVICE CONTROL SYSTEM FOR DETECTING TESTING DEVICE FAILURE

[75] Inventor: Masamichi Kawasoe, Kawasaki, Japan

[73] Assignee: Fujitsu Limited, Kawasaki, Japan

[21] Appl. No.: 975,095

[22] Filed: Nov. 12, 1992

[30] Foreign Application Priority Data

Nov. 13, 1991 [JP] Japan ................... 3-297034

[51] Int. Cl.$^5$ ........................... G06F 15/20
[52] U.S. Cl. ........................ 364/552; 73/1 R
[58] Field of Search ........... 364/550, 552; 324/73.1; 73/1 R

[56] References Cited

U.S. PATENT DOCUMENTS

| | | | |
|---|---|---|---|
| 4,573,130 | 2/1986 | Groult | 364/552 |
| 4,589,080 | 5/1986 | Abbott et al. | 364/552 |
| 4,707,796 | 11/1987 | Calabro et al. | 364/552 |
| 4,752,897 | 6/1988 | Zoeller et al. | 364/550 |
| 4,763,286 | 8/1988 | Nishimura et al. | 364/552 |
| 5,125,783 | 6/1992 | Kawasoe et al. | 414/279 |
| 5,170,362 | 12/1992 | Greenberg et al. | 364/550 |

FOREIGN PATENT DOCUMENTS 52156 4/1990 Japan ................... 364/552

*Primary Examiner*—Jack B. Harvey
*Assistant Examiner*—Craig Steven Miller

[57] ABSTRACT

A testing device control system capable of automatically detecting failures in the pallets for carrying products to be tested as well as failures in automatic testing devices along with the cables for connecting the pallets to the devices. A host computer is connected to a disc unit that contains for each testing device a plurality of testing item files, a detected testing device failure file, a detected pallet failure file and a testing device failure control file. For each testing device, a first defect item writing device writes to the disc unit the defect items of the product measured by a plurality of automatic testing devices. In addition, the number of the same defect items counted by the same automatic testing device is written to the disc unit. If the defect item count exceeds a predetermined value, failure information is written to the testing device failure control file and is displayed on a display unit.

7 Claims, 13 Drawing Sheets

FIG. I PRIOR ART

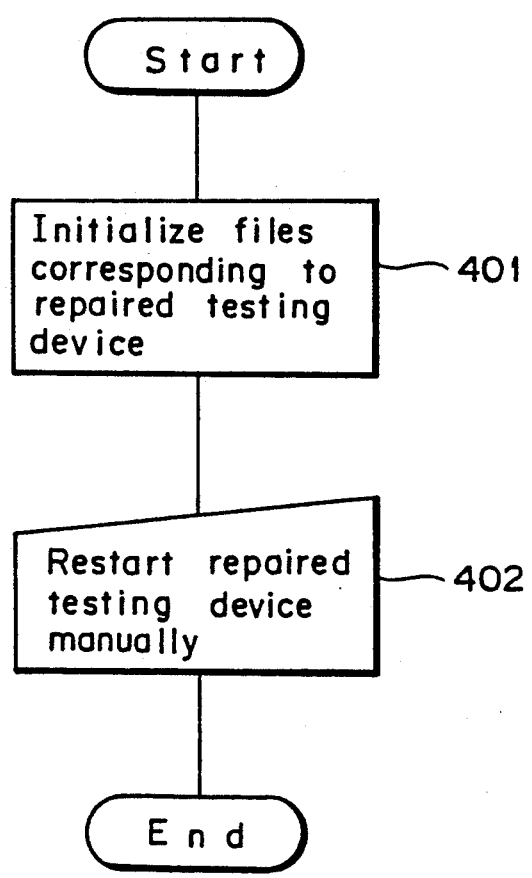

TESTING DEVICE CONTROL SYSTEM FOR DETECTING TESTING DEVICE FAILURE

BACKGROUND OF THE INVENTION

1. Field of the Invention

The present invention relates to a testing device control system for controlling testing devices such as automatic product testing equipment installed in production lines of factories.

2. Description of the Related Art

Today, almost all production lines of factories utilize automatic testing devices for automatically testing products such as communication equipment produced by the production lines. However, few production lines employ measures to control possible failures of the testing devices themselves and their attachments such as pallets that carry products. In case a testing device develops a failure, the product that the device is testing can be regarded as defective even though the product itself is in fact acceptable. Where the product testing is carried out unattended during the night or during other non-business hours, decisions cannot be made on whether the apparent failure detected is a product defect or a device failure and no follow-up countermeasures can be taken because no competent personnel are present at site. As a result, testing becomes inefficient. Thus the need is recognized for a testing device control system capable of automatically controlling testing device failures.

FIG. 1 is a schematic view of a typical prior art testing line for testing products such as communication equipment. In FIG. 1, a conveyor 1 rotating in circular fashion, i.e., in the arrowed direction Y1 and Y2, carries pallets 2 on which products 3 are mounted. As shown in FIG. 2, a schematic side view of the pallet and its connecting device, the product 3 is first placed on the pallet 2. Then a connector, not shown, of the product 3 is connected to a connector, not shown, at the tip of a cable 5 coupled to a connector 4 of the pallet 2.

Along the conveyor 1 are a plurality of automatic testing devices 7a through 7e. These automatic testing devices are equipped respectively with automatic connecting devices 6a through 6c each automatically attaching to the connector 4 of the pallet 2. It is cables 8 that connect the automatic connecting devices 6a through 6c respectively to the automatic testing devices 7a through 7c. The automatic connecting devices 6a through 6c electrically attach and detach the products 3 to and from the automatic testing devices 7a through 7c by means of pallets 2, the products 3 being carried along by the conveyor 1. The attaching and detaching of products 3 is accomplished as shown in FIG. 2. That is, a pin 10 of a connector 9 for each of the automatic connecting devices 6a through 6c is moved bidirectionally in an arrowed direction Y3 so as to connect with the connector 4 of the pallet 2.

As depicted in FIG. 3, a block diagram of a typical prior art automatic testing device control system, the automatic testing devices 7a through 7c are each composed of a disc unit 21 that stores various testing items and a computer 20 that controls the disc unit 21. Each computer 20 is connected to a host computer 19. The results of the testing of diverse testing items done by the automatic testing devices 7a through 7c are gathered by the host computer 19 and stored into a main disc unit 22. The gathered information is output to a printer 23 as needed.

Each of the automatic testing devices 7a through 7c has its computer 20 read from the main disc unit 22 a testing item file containing the necessary items to be tested by each device so that these marked items will be tested separately by the devices assigned thereto. Under this automatic testing device control system, the automatic testing devices 7a through 7c test or measure each product conveyed by the conveyor 1 for various electric characteristics defined by the testing items. The results are collected by the host computer 19 for each product tested or measured. Control information on the tested results, product failure information, control information on the completed test results and other relevant information are output by the printer 23.

The above-described prior art automatic testing device control system has one major disadvantage. That is, the system can find a product 3 to be defective even though its electric characteristics are normal, in case of a poor or severed connection involving any of the connectors 4 or cables 5 of the pallets 2 or the connectors 9 or cables 8 of the automatic connecting devices 6a through 6c, or in case of a failure involving any of the automatic testing devices 7a through 7c themselves.

The judgment calling a given product 3 a failure as a result of a faulty testing device or a malfunctioning pallet can only be corrected by competent personnel poring over the failure information output by the printer 23 about that product. This means that judgments on product failure may not be always correct and that countermeasures to correct the failure may not be implemented timely. Where testing is performed unattended during the night or during other non-business hours, the failure in a testing device or in its attachments cannot be corrected on the spot.

SUMMARY OF THE INVENTION

It is therefore an object of the present invention to provide a testing device control system capable of automatically detecting any failure in an automatic testing device or in its attachments during product testing.

It is another object of the invention to provide a testing device control system capable of detecting any failure in an automatic testing device and of having another automatic testing device take over the testing items assigned to the failed device.

In accordance with one aspect of the present invention, there is provided a testing, device control system comprising: a plurality of pallets for carrying a product each, each of the plurality of pallets having a connector for electric connection to the product carried; transport means for transporting the plurality of pallets; a plurality of automatic testing means furnished along the transport means; a plurality of automatic connection means for automatically connecting the plurality of automatic testing means to the connectors of the plurality of pallets; common storage means containing a testing item file, a detected testing means failure file, a detected pallet failure file and a testing means failure control file; a host computer connected to the plurality of automatic testing means and to the common storage means; first defect item writing means for writing to the detected testing means failure file for each automatic testing means the defect items of the product detected by the plurality of automatic testing means; first count writing means for counting the number of the same defect items detected by the same automatic testing means and for writing the defect item count to the detected testing means failure file, the first count writing means including means for canceling the defect item count when different defect items detected by the same automatic testing means are written to the detected testing means failure file by the first defect item writing means, and for writing to the detected testing means failure file the updated defect item count of the different defect items; first count setting means for setting a desired count; failure information writing means for writing failure information about any automatic testing means to the testing means failure control file when the defect item count exceeds the count set by the first count setting means; and first resetting means for resetting the defect items and the defect item count written to the detected testing means failure file when the testing of the product by the same automatic testing means proves the product to be good.

In a preferred structure according to the invention, the testing device control system further comprises: second defect item writing means for writing to the detected pallet failure file for each pallet the defect items of the product detected by the plurality of automatic testing means; second count writing means for counting the number of the same defect items detected from the same pallet and for writing the defect item count to the detected pallet failure file, the second count writing means including means for canceling the defect item count when different defect items detected from the same pallet are written to the detected pallet failure file by the second defect item writing means, and for writing to the detected pallet failure file the updated defect item count of the different defect items; second count setting means for setting a desired count; failure information display means for displaying pallet failure information on a display unit when the count written by the second count writing means exceeds the count set by the second count setting means; and second resetting means for resetting the defect items written to the detected pallet failure file as well as the count written by the second count writing means when the testing of the product carried by the same pallet proves the product to be good.

Preferably, the testing device control system includes means for checking the operating status of a given testing device and two other testing devices flanking it, one being located immediately upstream and the other immediately downstream. When the upstream or downstream testing device develops a failure, the testing item file of the failed testing device is read out along with that of the current testing device so that the testing will continue with the failed device taken over by the current testing device.

The present invention is based on the assumption that the probability of different products testing defective consecutively for the same testing item is extremely low. If the number of failures detected for the same testing item exceeds a predetermined count, the system judges some testing device to be defective.

The above and other objects, features and advantages of the present invention and the manner of realizing them will become more apparent, and the invention itself will best be understood from a study of the following description and appended claims with reference to the attached drawings showing some preferred embodiments of the invention.

BRIEF DESCRIPTION OF THE DRAWINGS

FIG. 12 is a flowchart of steps representing a failure resetting process performed by the embodiment.

DESCRIPTION OF THE PREFERRED EMBODIMENT

The preferred embodiment of the invention will now be described with reference to the accompanying drawings.

Figure 4:
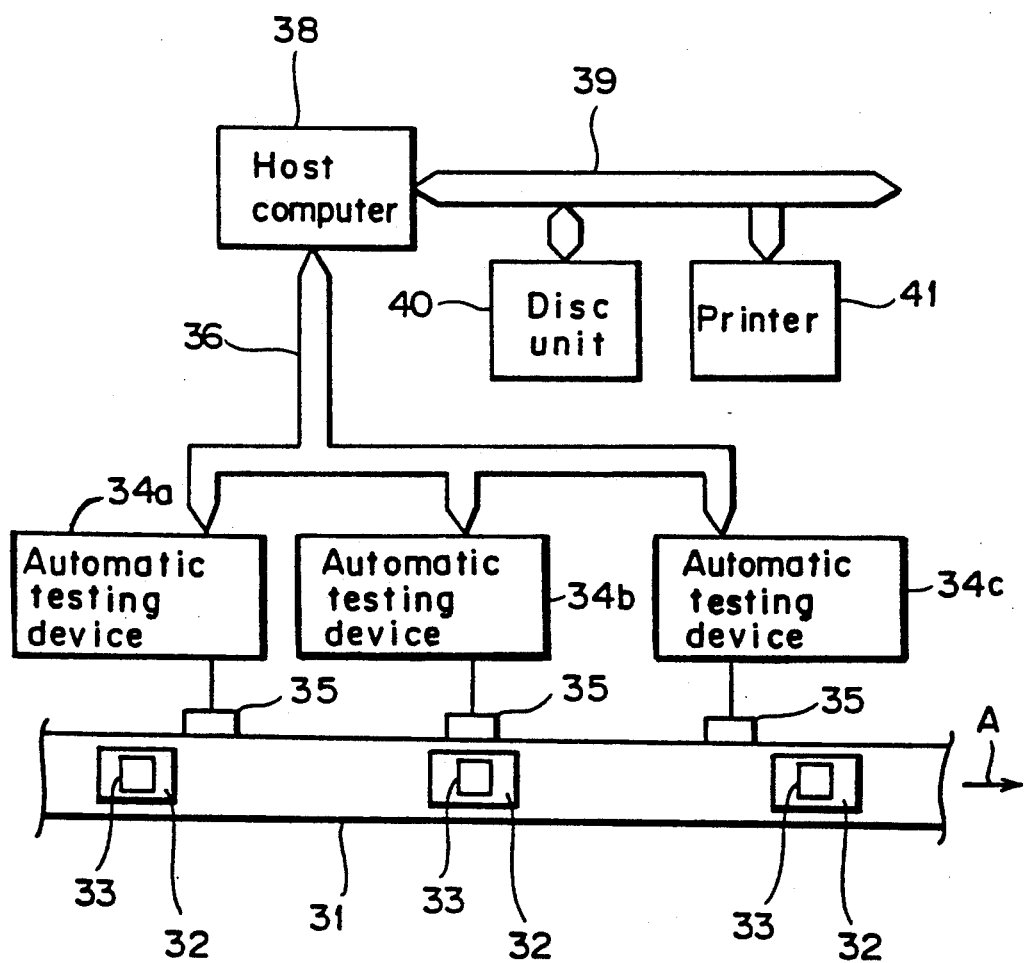
FIG. 4 is a block diagram of an automatic testing device control system embodying the invention.

Referring to FIG. 4, a conveyor 31 (e.g., roller conveyor) is driven in the arrowed direction A. The conveyor 31 conveys pallets 32 each carrying a product 33, the pallet and product combinations being transported in the arrowed direction A. Along the conveyor 31 are automatic testing devices 34a, 34b and 34c for electrically testing the products. Each automatic testing device is equipped with an automatic connecting device 35 that electrically attaches to the pallet 32 in automatic fashion. The automatic testing devices 34a, 34b and 34c incorporate a computer each, and are connected to a host computer 38 via a bus 36. The host computer 38 is connected to a disc unit 40 and a printer 41 via a bus 39.

Figure 5:
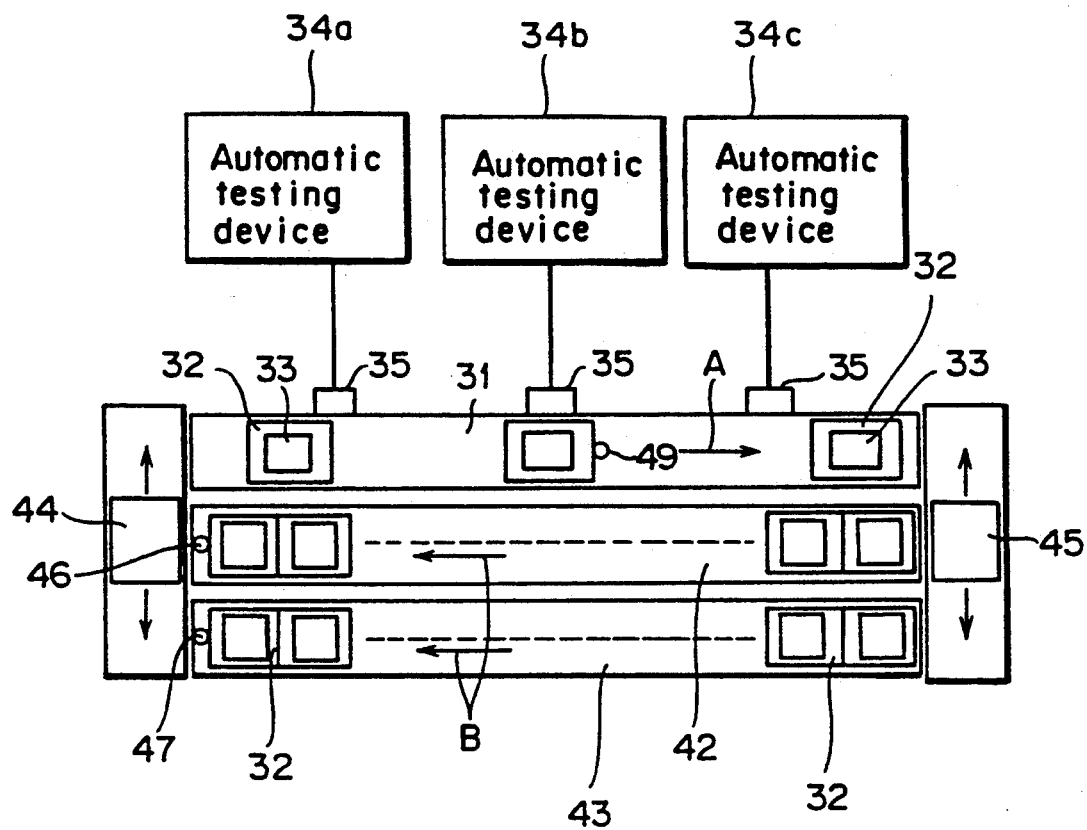
FIG. 5 is a plan view of a conveyor for use with the embodiment FIG. 4.

Referring to FIG. 5, how the conveyor system is illustratively implemented will now be described. The conveyor 31 running alongside of the automatic testing devices 34a, 34b and 34c is paralleled by two conveyors 42 and 43. The conveyor 31 is driven in the arrowed direction A, whereas the conveyors 42 and 43 are driven in the arrowed direction B, i.e., opposite to the direction in which the conveyor 31 moves. Both ends of the conveyors 31, 42 and 43 are provided with traversers 44 and 45 which move in reciprocating fashion across the three conveyors as indicated.

The conveyors 42 and 43 carry pallets 32 with products 33 mounted thereon, the pallets being in contact with one another from one end to the other of the conveyors. While the automatic testing line is operating, the conveyors 42 and 43 are driven continuously in the arrowed direction B. Stoppers 46 and 47 at the leftmost positions of the conveyors 42 and 43 are controlled retractably by a conveyor controller, not shown. When retracted below the conveyor surface, the stopper allows a pallet 32 to move from the conveyor 42 or 43 onto the traverser 44. In turn, the traverser 44 under control of the conveyor controller forwards the pallet 32 to the conveyor 31.

Figure 1:
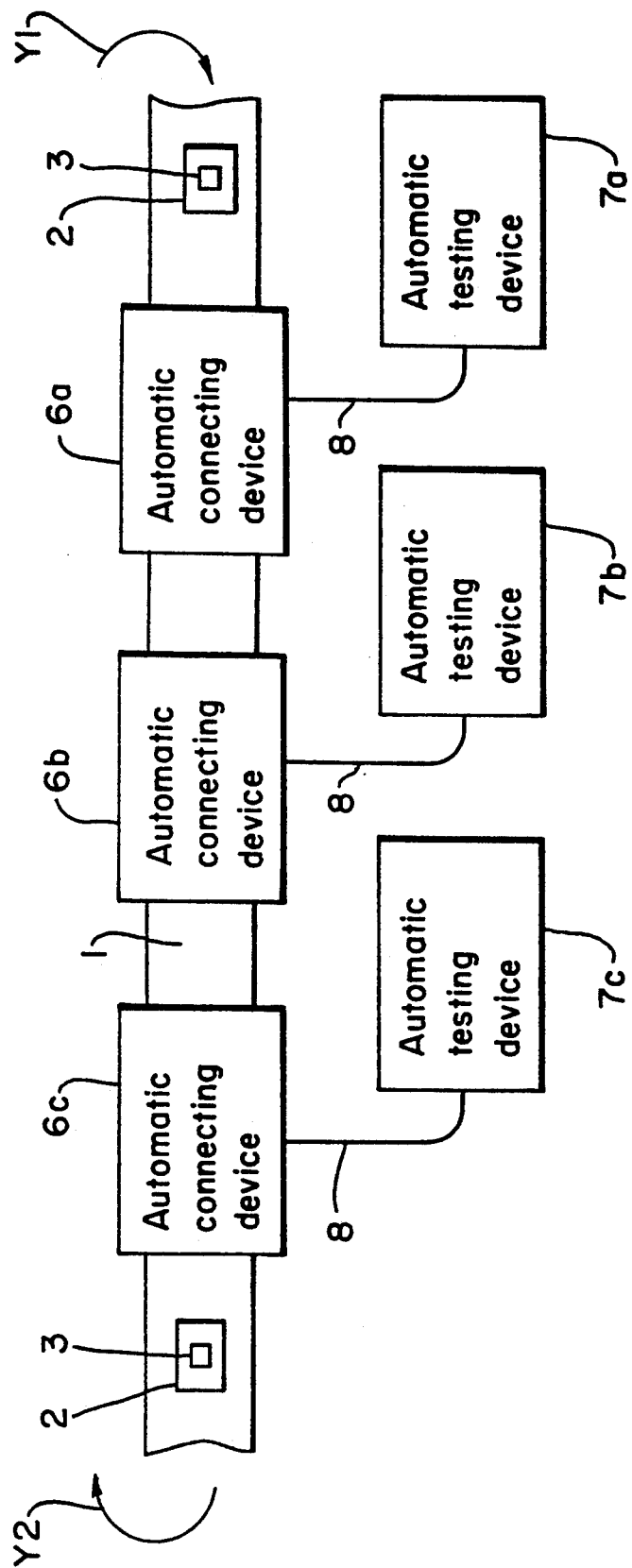
FIG. 1 is a schematic view of a typical prior art testing line.
Figure 2:
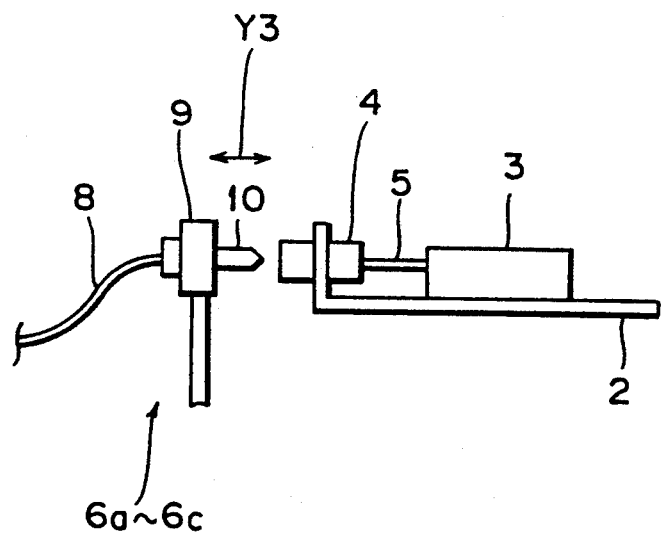
FIG. 2 is a schematic side view of a pallet and its connecting device for use with the prior art testing line.
Figure 3:
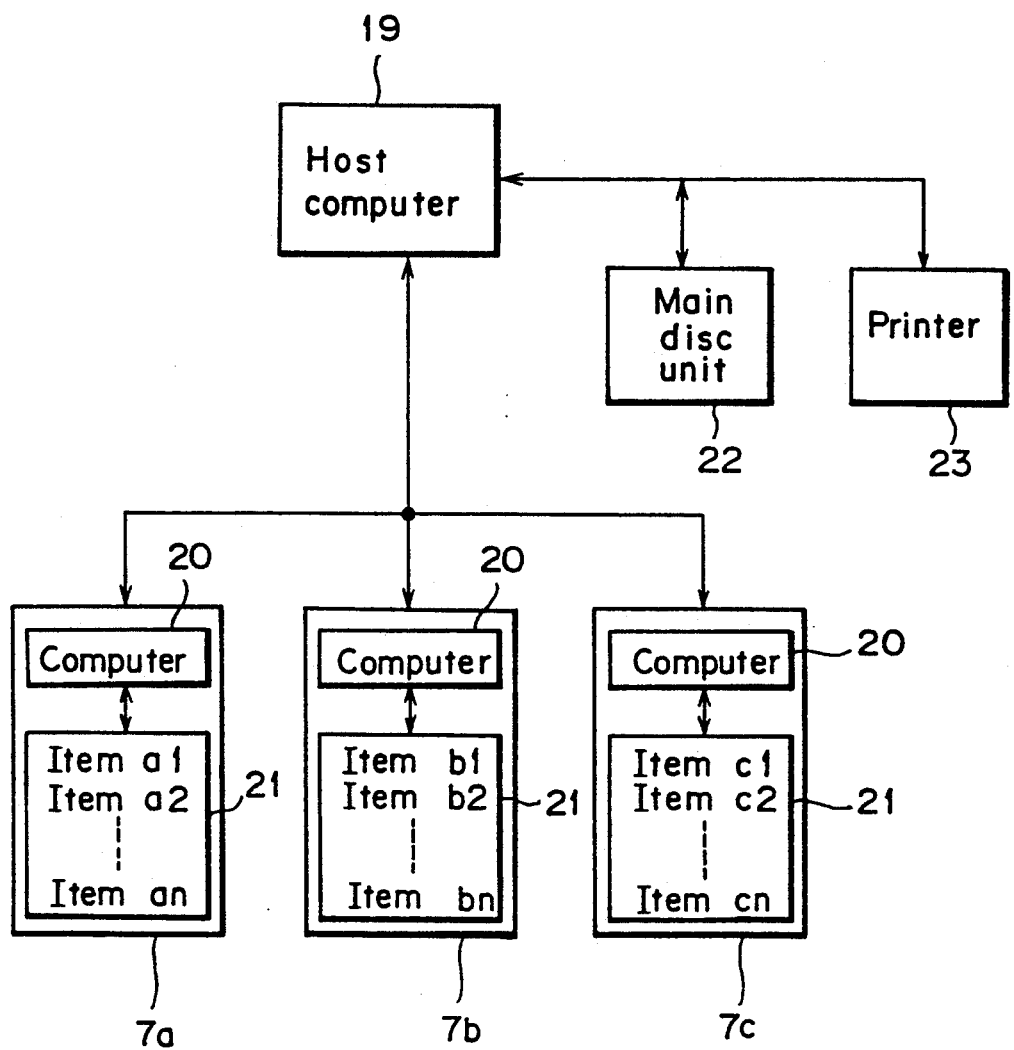
FIG. 3 is a block diagram of a typical prior art automatic testing device control system.
Figure 6:
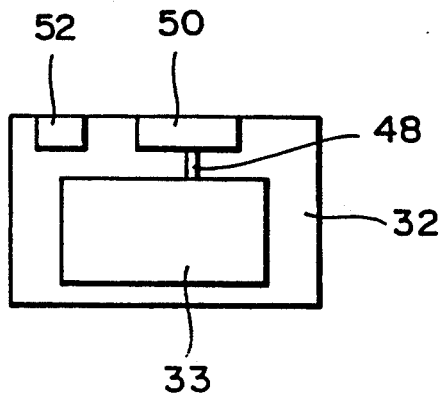
FIG. 6 is a schematic plan view of a pallet carrying a product in connection with the embodiment.

The pallet 32 with the product 33 set thereon is transported by the conveyor 31 in the arrowed direction A. Upon arrival of the pallet 32 in front of the automatic testing device 34a, 34b or 34c, another stopper 49 emerges from below the conveyor surface to stop the pallet there. The pallet 32 is then raised to a predetermined position by a cylinder device, not shown. As depicted in FIG. 6, the pallet 32 has a connector 50 and a mechanical flag 52. The connector 50 is coupled electrically to the product 33 when a connector, not shown, at the tip of a cable 48 is connected to a connector, not shown, of the product 33. After being raised to the predetermined position, the pallet 32 has its connector 50 connected automatically to the connector of the automatic connecting device 35 whose construction is shown in FIG. 2. This allows the product 33 mounted on the pallet 32 to be connected electrically to the automatic testing device 34a, 34b or 34c via the cable 48, connector 50 and automatic connecting device 35.

Table 1 below lists typical testing items for which the automatic testing devices 34a, 34b and 34c test such equipment as transmitters. Each of the automatic testing devices tests different testing items. For example, the automatic testing device 34a cheeks testing items 1 through 4; the device 34b verifies items 5 through 8; and the device 34c addresses items 9 through 12. The conveyor 31 is stopped during the testing.

TABLE 1

| No. | Testing Items |
|---|---|
| 1 | Transmission frequency |
| 2 | Output power |
| 3 | Frequency deviation (standard) |
| 4 | Frequency deviation (maximum) |
| 5 | Audio frequency response (150 Hz) |
| 6 | Audio freguency response (400 Hz) |
| 7 | Audio frequency response (2.5 kHz) |
| 8 | Audio freguency response (4.0 kHz) |
| 9 | Distortion |
| 10 | Transmission spurious |
| 11 | Transmission carrier-off level |
| 12 | Current consumption |

The product 33 with all its testing completed is transported together with the pallet 32 onto the traverser 45. The traverser 45 in turn transfers the product 33 to either the conveyor 42 or conveyor 43. Because the total number of products 33 is controlled by the host computer 38, the operation of the conveyors 31, 42 and 43 is stopped when all products have been tested.

Figure 7:
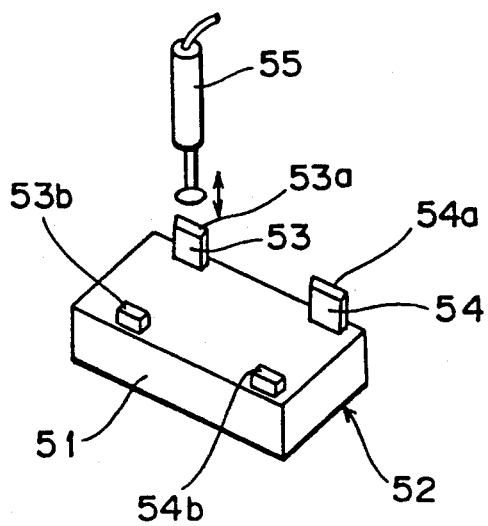
FIG. 7 is a perspective view of a mechanical flag for use with the embodiment.

Referring to FIG. 7, how the mechanical flag 52 attached to the pallet 32 works will now be described. An enclosure 51 has two flags 53 and 54 mounted rotatably on a hinge inside, not shown. Initially, the flags 53 and 54 are set so that their edges 53a and 54a at one end will project from the enclosure and their edges 53b and 54b at the other end will be retracted into the enclosure. The flag 53 is a test result indication flag showing whether a given product is good or defective. The flag 54 is a pass flag that indicates whether or not a product 33 has passed the testing line comprising the automatic testing devices.

If the product has no defective parts upon completion of all testing, the flag 53 is left with its edge 53a projected while the pass flag 54 has its edge 54a pushed in so that the other edge 54b emerges. Thus a visual cheek on the flags 53 and 54 tells that the product 33 has successfully passed the testing line and has no defects. If the product 33 has failed even one testing item, a cylinder 55 pushes in the edge 53a of the flag 53 so as to project the other edge 53b. Furthermore, the edge 54b of the pass flag 54 is pushed in so as to project the other edge 54b. This shows that the product 33 that transited the automatic testing line has proved defective.

Figure 8:
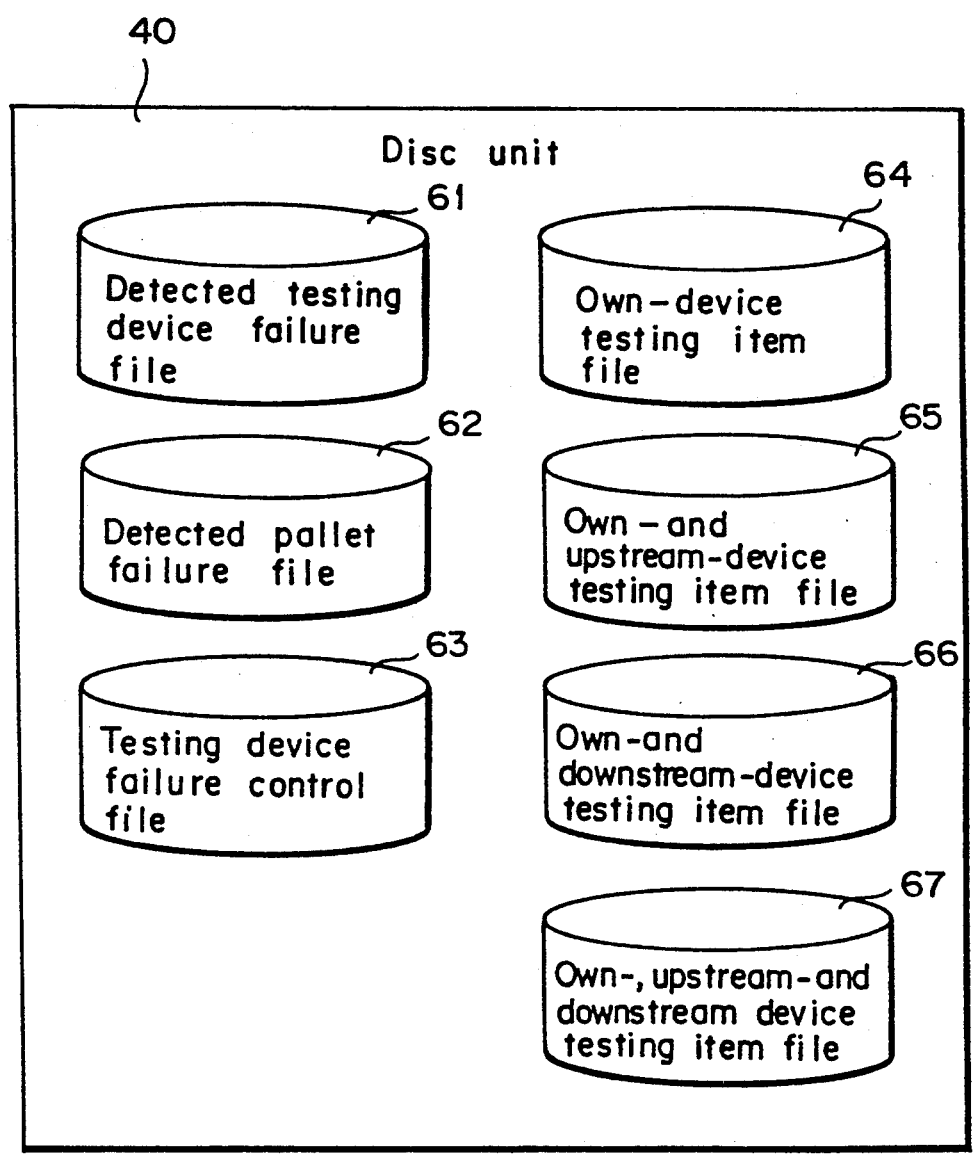
FIG. 8 is a view depicting how files are structured in a disc unit in connection with the embodiment.

Referring to FIG. 8, how files in the disc unit 40 are illustratively structured will now be described. The disc unit 40 contains a detected testing device failure file 61, a detected pallet failure file 62 and a testing device failure control file 63. If the product tests defective for a given testing item, defect information on that product is written to the detected testing device failure file 61 and the detected pallet failure file 62 simultaneously. Specifically, the testing device number involved, the product serial number and the failed testing item number are written to the detected testing device failure file 61, whereas the pallet number involved, the product serial number and the failed testing item number are written to the detected pallet failure file 62. The testing device failure control file 63 controls whether or not a predetermined failure count is exceeded by the number of consecutive failures for the same testing item tested by each automatic testing device.

The disc unit 40 further includes for each automatic testing device own-device testing item files 64, own- and upstream-device testing item files 65, own- and down-stream-device testing item files 66, and own-, upstream- and downstream-device testing item files 67.

Referring now to the flowcharts of FIGS. 9 through 12, there will be described in detail how the testing device control system embodying the invention works.

Figure 9:
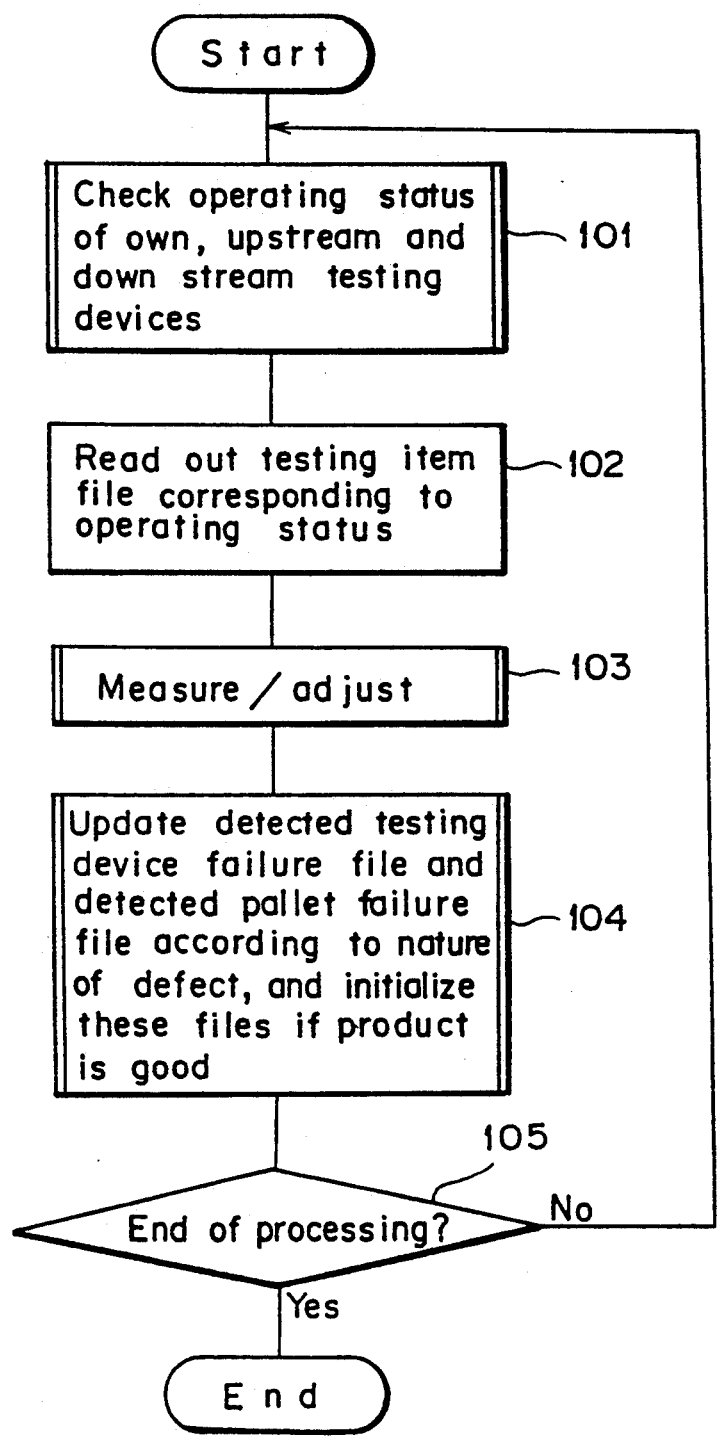
FIG. 9 is a flowchart of steps outlining the processing of a testing device in connection with the embodiment.
Figure 10A:
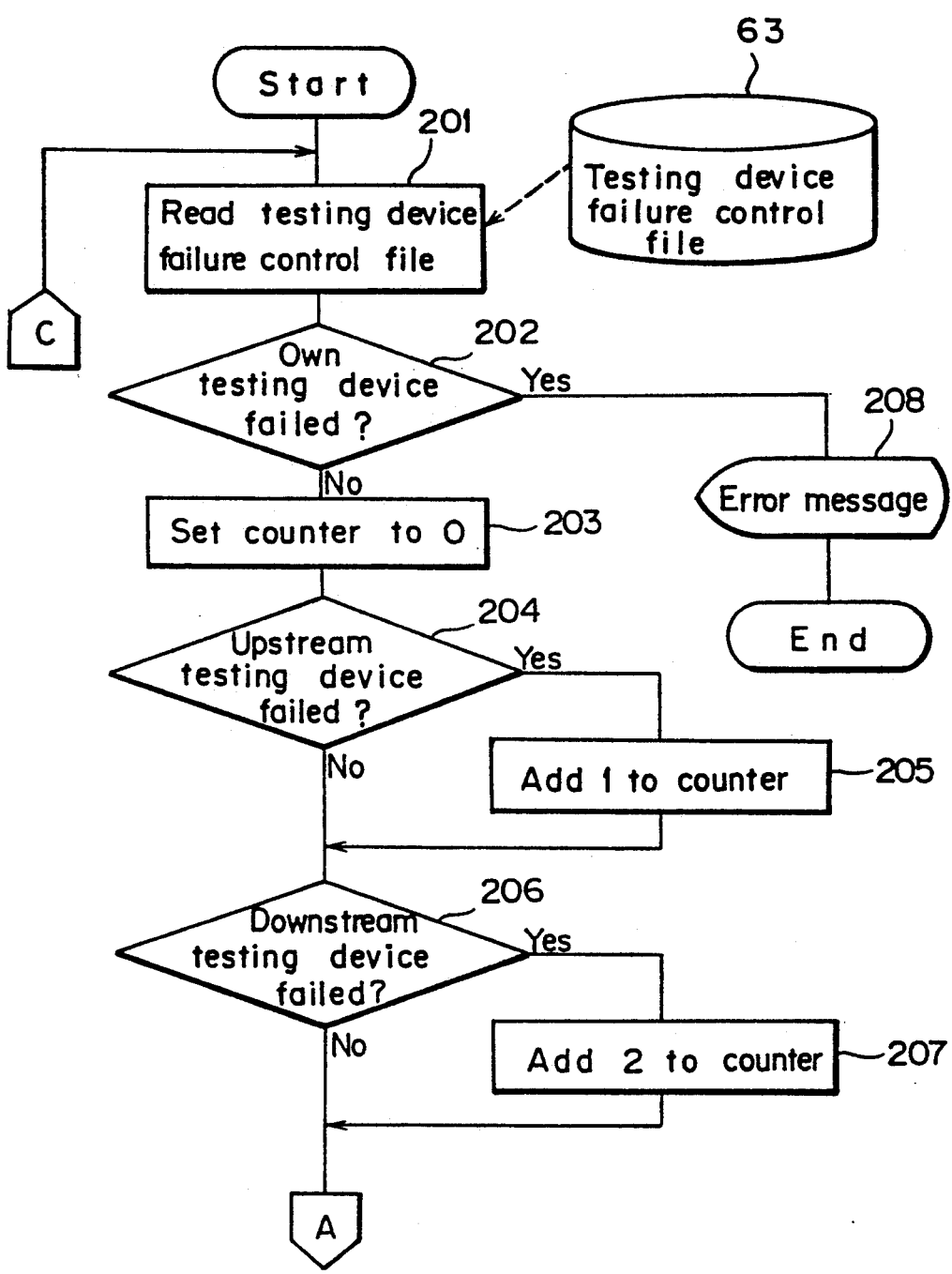
FIGS. 10A through 10C are flowcharts of specific steps carried out by the testing device in connection with the embodiment.
Figure 10B:
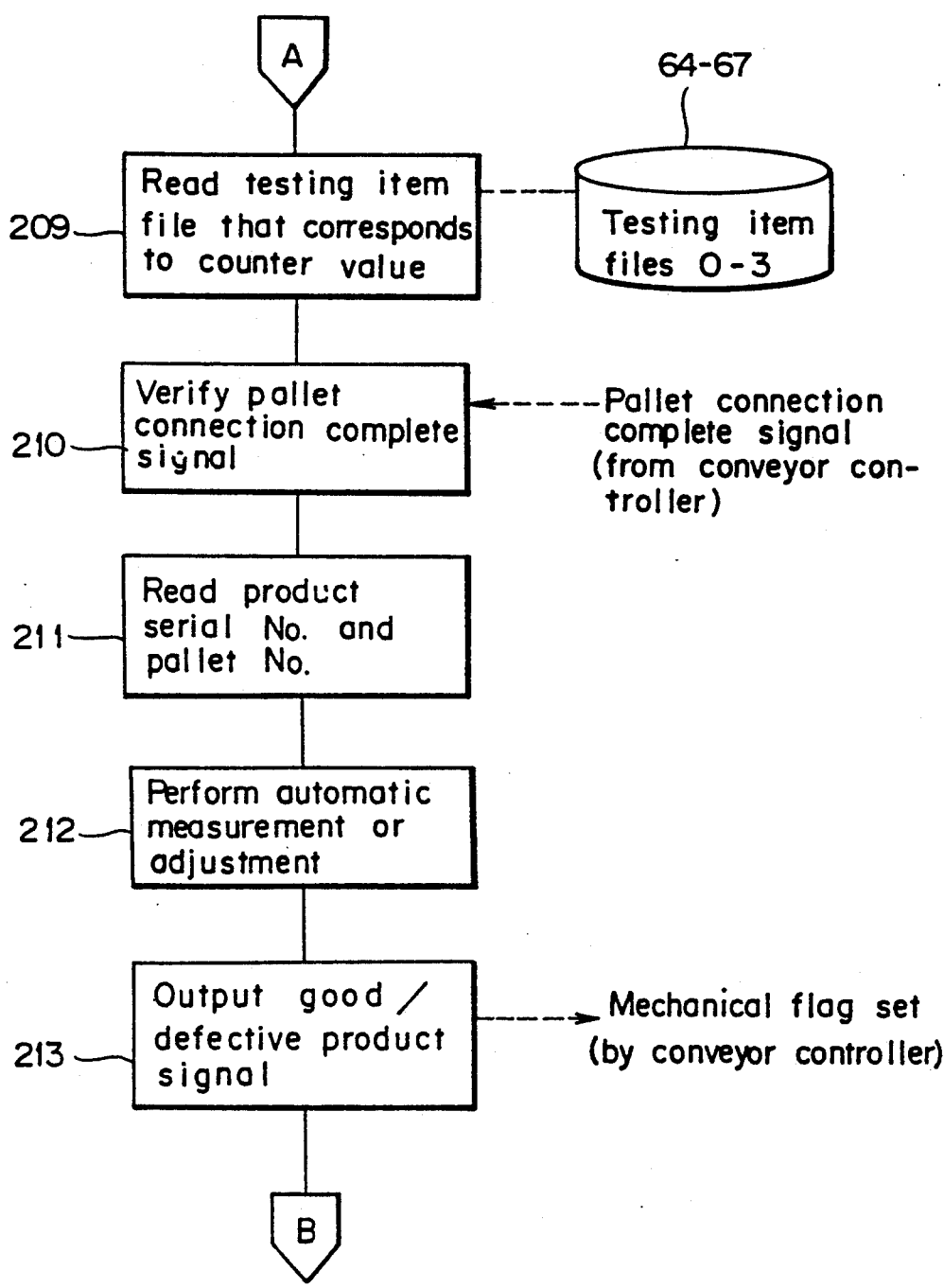
Figure 10C:
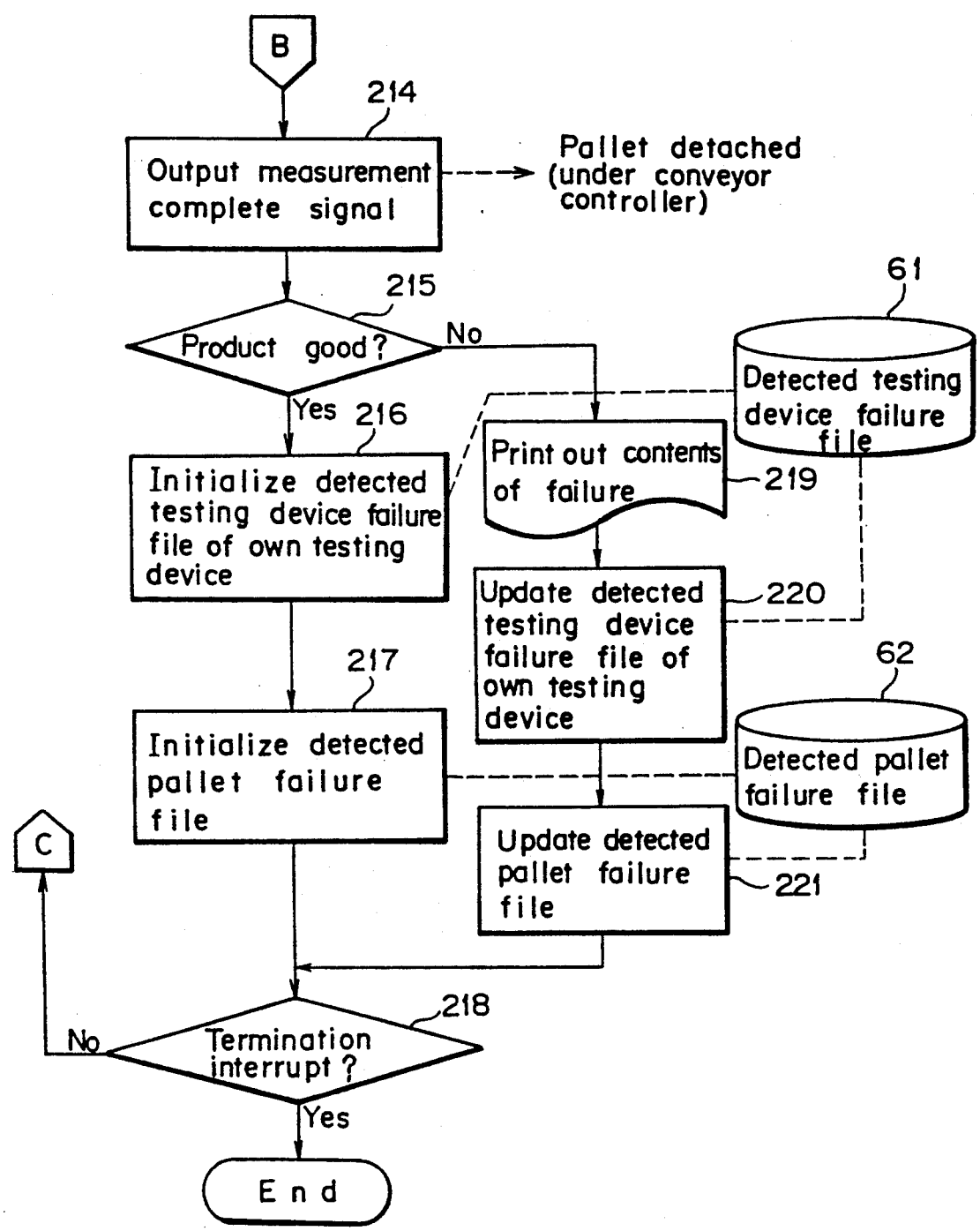

FIGS. 9 and 10A through 10C show steps of the processing performed by a testing device in the embodiment. FIG. 9 outlines the processing of the testing device in major steps, and FIGS. 10A through 10C give detailed steps of the processing.

In step 101 of FIG. 9, the testing device checks its own operating status as well as that of the immediately upstream and downstream testing devices. The checking process is detailed in FIG. 10A. Referring to FIG. 10A, step 201 reads the testing device failure control file 63. Step 202 checks to see if the own testing device is defective. If the own device is found normal, step 203 is reached in which a counter is set to 0. Step 204 checks to see if the upstream testing device is defective. If the upstream device is found normal, step 206 is reached in which a check is made to see if the downstream testing device is defective. In case step 204 finds the upstream testing device to be defective, step 205 is reached in which a value of 1 is added to the counter. If step 206 finds the downstream testing device to be defective, step 207 is reached in which a value of 2 is added to the counter. Table 2 below lists how the values on the counter correspond to the range of the testing items covered by the testing devices.

TABLE 2

| Values on counter | Coverage of testing Items |
|---|---|
| 0 | Own device |
| 1 | Own and upstream devices |
| 2 | Own and downstream devices |
| 3 | Own, upstream and downstream devices |

When the values on the counter are made to correspond with the range of the testing items covered by the respective testing devices as shown in Table 2, the file of the testing items covered by a failed testing device is read in and taken over by another testing device as it reads its own testing item file. In this manner, all necessary testing items of a product may be tested by a single automatic testing device.

If step 202 finds the own testing device to be defective, step 208 is reached in which the printer 41 outputs an error message and the processing comes to an end. In this case, the own testing device has failed and product cannot be tested thereby.

Referring again to FIG. 9, the check on the testing device operating status in step 101 is followed by step 102. In step 102, the testing item file corresponding to the current operating status is read out. Step 102 is followed by step 103 that performs automatic measurement and adjustment.

Steps 102 and 103 of FIG. 9 will now be described in more detail with reference to FIGS. 10B and 10C. Step 102 of FIG. 9 corresponds to step 209 of FIG. 10B. Step 209 reads in the testing item file that matches the value on the counter. In step 210, a pallet connection complete signal emitted by the conveyor controller is verified. With the pallet connection completed, step 211 reads the product serial number and the pallet number. Step 212 performs automatic measurement or automatic adjustment on the product.

With the product measured or adjusted, step 213 outputs a good/defective product signal so that the conveyor controller sets the mechanical flag 52 of FIG. 7 accordingly. In step 214 of FIG. 10C, a measurement complete signal is output so that the conveyor controller causes the pallet 32 to be detached from the automatic connecting device 35.

Referring again to the processing of FIG. 9, the measurement or adjustment in step 103 is followed by step 104. In step 104, the detected testing device failure file and the detected pallet failure file are updated in accordance with the nature of the detected failure. If the product has no defects, both files are initialized.

Step 104 of FIG. 9 will now be described in more detail with reference to FIG. 10C. In step 215, a check is made to see if the product is good or defective. If the product is found to be good, step 216 is reached in which the detected testing device failure file 61 of the own testing device is initialized. In step 217, the detected pallet failure file 62 is initialized. Step 218 checks to see if a termination interrupt has occurred. If the interrupt has occurred, the processing is terminated; if no such interrupt has occurred, step 201 of FIG. 10A is again reached.

If step 215 finds the product to be defective, step 219 is reached in which the nature of the defect is printed out. Then step 220 updates the detected testing device failure file 61 of the own testing device, and step 221 updates the detected pallet failure file 62. That is, if the contents of the detected failure are the same, a value of 1 is added to the counter for both the files 61 and 62 of the own testing device. If the contents of the detected failure are different, both the failed testing items and the count value written in the detected testing device failure file 61 and in the detected pallet failure file 62 are reset; the new failed testing items are written in place of the old, and the counter is set to 1.

Figure 11:
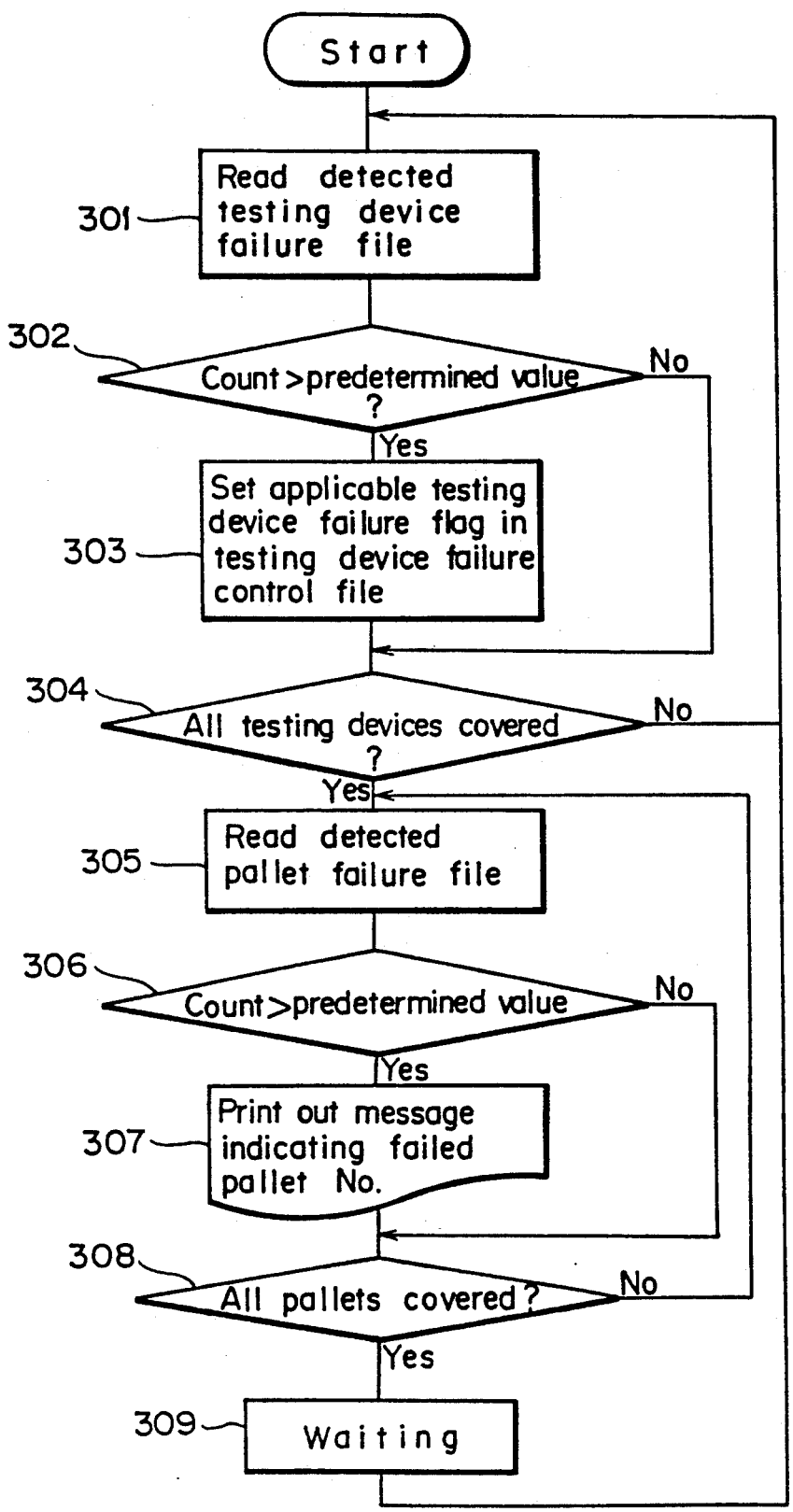
FIG. 11 is a flowchart of steps constituting a control process executed by a host computer in connection with the embodiment.

Referring to FIG. 11, how the host computer 38 carries out its control process will now be described. The present invention works on the basis of the assumption that the probability of different products testing defective consecutively for the same testing item is extremely low. If the number of failures detected for the same testing item exceeds a predetermined count, the host computer judges the testing device to be defective.

In step 301, the detected testing device failure file 61 is read in. Step 302 checks to see if the count value for the same testing item is greater than a predetermined value of, say, 3. If the count value is found to be greater than the predetermined value, step 303 is reached in which the applicable testing device failure flag is set in the testing device failure control file 63. The setting of the flag permits easy verification of which testing device has failed.

Steps 301 through 303 are repeated for all testing devices. Step 304 checks to see if all testing devices have been covered. If all testing devices are found to be covered in step 304, step 305 is reached in which the detected pallet failure file 62 is read in. Step 306 checks to see if the count value for the same testing item is greater than a predetermined pallet value of, say, 2. If the count value is found to be greater than the predetermined value in step 306, step 307 is reached in which the printer 41 prints out an error message indicating the number of the failed pallet. Steps 305 through 307 are repeated for all pallets. Step 308 checks to see if all pallets have been covered. If all pallets are found to be covered, step 309 is reached in which the host computer waits for a few minutes before returning to step 301.

The testing device for which the failure flag is set in step 303 is automatically disconnected from the testing line. The testing items assigned to the failed testing device are taken over by the device upstream or downstream thereof. The pallet for which the failed pallet number was printed in step 307 is detached manually from the testing line by an operator.

Referring to FIG. 12, how a failure recovery process of the embodiment is implemented will now be described. First, step 401 initializes the detected testing device failure file 61 and testing device failure control file 63 which correspond to the repaired testing device. In step 402, the repaired testing device is restarted manually. The same procedure also applies to pallets. That is, the detected pallet failure file 62 of the repaired pallet 32 is initialized, and the repaired pallet 32 is returned manually to the testing line.

In the above-described embodiment, the disc unit 40 contains four testing item files 64 through 67 for each of the automatic testing devices. Alternatively, one testing item file may be set for each testing device. If a testing device fails, the testing item file of that device may be read out and taken over by another testing device as the latter reads its own testing item file.

As described, the testing device control system according to the invention makes it easy to determine failures in automatic testing devices and their attachments including automatic connecting devices and cables as well as failures of pallets for use with the testing devices. Because the system causes the testing items of a failed testing device to be taken over by another testing device, the invention is especially suited for unattended testing line runs during the night or during other non-business hours.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. A testing device control system comprising:

a plurality of pallets for carrying a product each, each of said plurality of pallets having a connector for electric connection to the product carried;

transport means for transporting said plurality of pallets;

a plurality of automatic testing means furnished along said transport means;

a plurality of automatic connection means for automatically connecting said plurality of automatic testing means to the connectors of said plurality of pallets;

common storage means containing a testing item file, a detected testing means failure file, a detected pallet failure file and a testing means failure control file;

a host computer connected to said plurality of automatic testing means and to said common storage means;

first defect item writing means for writing to said detected testing means failure file for each automatic testing means the defect items of said product detected by said plurality of automatic testing means;

first count writing means for counting the number of the same defect items detected by the same automatic testing means and for writing the defect item count to said detected testing means failure file, said first count writing means including means for canceling said defect item count when different defect items detected by said same automatic testing means are written to said detected testing means failure file by said first defect item writing means, and for writing to said detected testing means failure file the updated defect item count of said different defect items;

first count setting means for setting a desired count;

failure information writing means for writing failure information about any automatic testing means to said testing means failure control file when said defect item count exceeds the count set by said first count setting means; and first resetting means for resetting said defect items and said defect item count written to said detected testing means failure file when the testing of said product by said same automatic testing means proves said product to be good.

2. A testing device control system according to claim 1, further comprising:

display means connected to said host computer;

second defect item writing means for writing to said detected pallet failure file for each pallet the defect items of said product detected by said plurality of automatic testing means;

second count writing means for counting the number of the same defect items detected from the same pallet and for writing the defect item count to said detected pallet failure file, said second count writing means including means for canceling said defect item count when different defect items detected from said same pallet are written to said detected pallet failure file by said second defect item writing means, and for writing to said detected pallet failure file the updated defect item count of said different defect items;

second count setting means for setting a desired count;

failure information display means for displaying pallet failure information on said display means when the count written by said second count writing means exceeds the count set by said second count setting means; and second resetting means for resetting said defect items written to said detected pallet failure file as well as said count written by said second count writing means when the testing of said product carried by said same pallet proves said product to be good.

3. A testing device control system according to claim 2, wherein said pallet has a mechanically operable mechanical flag arrangement; and said control system further comprising flag actuating means actuating said mechanical flag arrangement when the testing of said product proves said product to be defective.

4. A testing device control system according to claim 1, wherein said testing item file includes for each testing means a plurality of own-testing means testing item files, a plurality of own- and upstream-testing means testing item files, and a plurality of own- and downstream-testing means testing item files.

5. A testing device control system according to claim 1, wherein said testing item file is constituted by a plurality of own-testing means testing item files provided for each of said testing means.

6. A testing device control system according to claim 4, further comprising:

means for checking the operating status of the own, upstream and downstream testing means; and means for reading out the testing item file corresponding to the operating status of a given testing means.

7. A testing device control system according to claim 5, further comprising:

means for checking the operating status of the own, upstream and downstream testing means; and means for reading out the testing item file corresponding to the operating status of a given testing means.

* * * * *